(12) United States Patent
Yoder (10) Patent No.: US 7,134,711 B1
(45) Date of Patent: Nov. 14, 2006

(54) RECREATIONAL VEHICLE ROOF SUPPORT RAFTER

(75) Inventor: Ronald Yoder, Lagrange, IN (US)

(73) Assignee: Automated Products International, LLC, Howe, IN (US)

( * ) Notice: Subject to any disclaimer, the term of this patent is extended or adjusted under 35 U.S.C. 154(b) by 48 days.

(21) Appl. No.: 10/715,327

(22) Filed: Nov. 17, 2003

(51) Int. Cl.
*B62D 25/06* (2006.01)
*B62D 31/02* (2006.01)

(52) U.S. Cl. ............ 296/210; 296/187.13; 296/193.12; 296/29

(58) Field of Classification Search .......... 296/187.13, 296/185.1, 193.12, 210, 29, 30; 52/639, 52/86
See application file for complete search history.

(56) References Cited

U.S. PATENT DOCUMENTS

| | | | | |
|---|---|---|---|---|
| 1,910,397 A | * | 5/1933 | Lewis | 296/210 |
| 2,138,084 A | * | 11/1938 | Bare | 296/210 |
| 2,645,521 A | * | 7/1953 | Judson | 296/185.1 |
| 3,035,161 A | * | 5/1962 | Kalt | 362/479 |
| RE25,914 E | * | 11/1965 | Richter et al. | 296/186.1 |
| 3,921,320 A | * | 11/1975 | McWilliams | 40/493 |
| 3,962,015 A | * | 6/1976 | Heimann | 156/295 |
| 4,089,148 A | * | 5/1978 | Oehmsen et al. | 52/693 |
| 4,623,189 A | * | 11/1986 | Stead | 296/186.2 |
| 4,639,033 A | | 1/1987 | Wheatley | |
| 4,887,406 A | * | 12/1989 | Saia | 52/694 |
| 5,681,076 A | * | 10/1997 | Yoshii | 296/210 |
| 5,706,752 A | | 1/1998 | Menne, Jr. | |
| 5,769,486 A | * | 6/1998 | Novoa et al. | 296/210 |
| 6,073,993 A | | 6/2000 | Iwatsuki | |
| 6,173,547 B1 | | 1/2001 | Lipson | |
| 6,360,491 B1 | | 3/2002 | Ullman | |
| 6,505,883 B1 | | 1/2003 | Ehrlich | |
| 2002/0116892 A1 | * | 8/2002 | Baranian | 52/693 |
| 2003/0188499 A1 | * | 10/2003 | Bronner | 52/378 |

* cited by examiner

*Primary Examiner*—D. Glenn Dayoan
*Assistant Examiner*—Greg Blankenship
(74) *Attorney, Agent, or Firm*—O'Malley and Firestone (57) ABSTRACT

A body structure for a customized van is enhanced by providing a roof support element which is light in weight, strong, and easily shaped to conform to curved roof lines. The body structure comprises a rafter having upper and lower extruded rails and a plurality of gussets connected between the rails to join the rails in a single member. The rails are T-shaped in cross section with the upright of the T providing a point for connection of the gussets.

15 Claims, 9 Drawing Sheets

RECREATIONAL VEHICLE ROOF SUPPORT RAFTER

BACKGROUND OF THE INVENTION

1. Technical Field

The invention relates generally to trailers, recreational vehicles, and custom van body structures and, in particular, to a roof support of light weight and possessing ease of fabrication which supports vehicle roofs of contoured shapes of variable radii.

2. Description of the Problem

Recreational vehicles and vacation trailers make frequent use of a raised roof, which allows the addition of ceiling mounted entertainment equipment and storage space, and the routing of air ducts. Fabrication of an aesthetically pleasing roof fit for these purposes, which also exhibits strength, is better served by providing designers the ability to incorporate curved sheet metal elements, rubber membranes, or fiber glass sections, rather than flat elements. Underside supports for such roofs should conform to the shape of the roof if possible. These supports should also limit or reduce the direct labor cost involved in construction of the vehicle.

Contemporary design has relied on square cross section extruded aluminum channels as structural elements. The channels are often joined using galvanized steel sheet metal gussets to fabricate roof support elements. Fabrication of roof support elements from these elements has required welding, adhesive joining or screws, adding greatly to direct labor required to construct the vehicles.

SUMMARY OF THE INVENTION

According to the invention there is provided a rafter for supporting the roof of vehicle. The rafter comprises lower and upper rails of sufficient length to extend from side to side of a roof of a vehicle. The lower and the upper rail each have a cross member and an upright member extending outwardly perpendicular from one face of the cross member. The upper and lower rails are disposed in a common plane with their respective upright members extending toward one another. A plurality of gussets are attached to the upright members and extend between the lower and upper rails to join the upper and lower rails to one another. The upper rail is shaped to allow a face of the cross member to fit against an underside surface of the roof of a vehicle. The rafter further includes the lower rail having an elongated pocket defined between one side of the upright member and a side of the cross member to one side of the upright member.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1A:
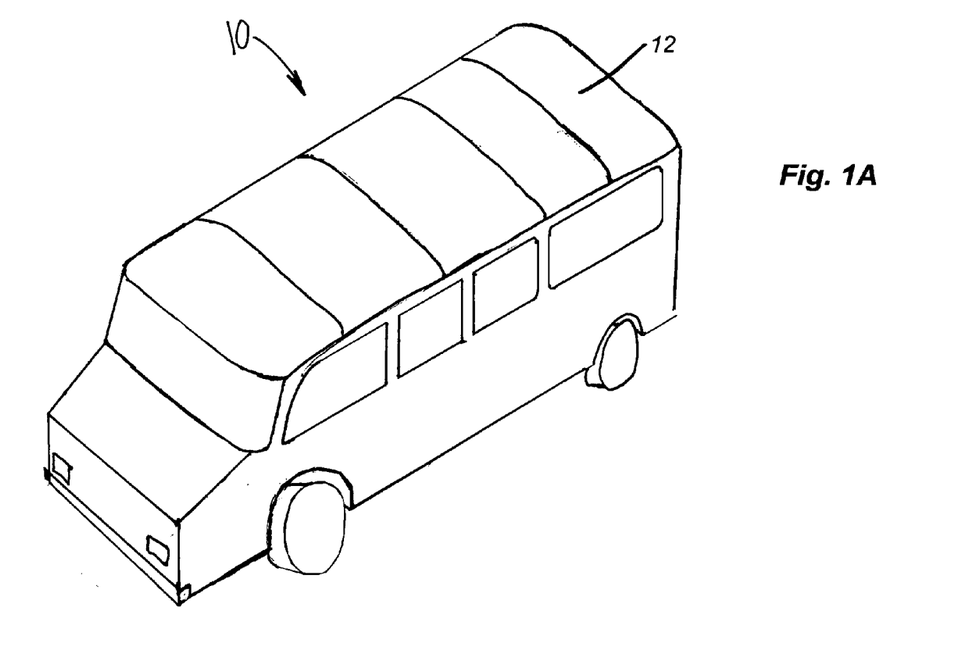
FIGS. 1A and 1B are perspective views of recreational vehicles.
Figure 1B:
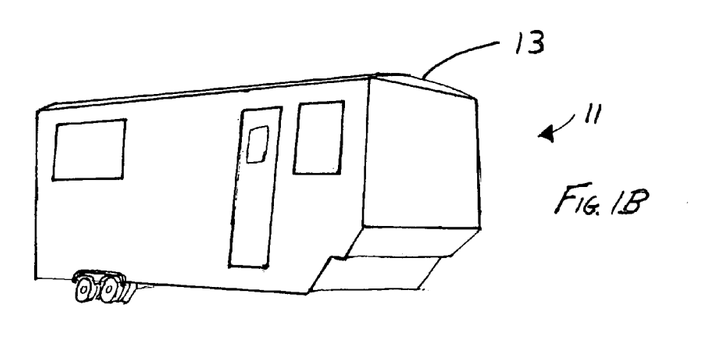

Referring now to the figures and in particular to FIGS. 1A–B there are illustrated recreational vehicles 10, 11 having roofs 12, 13. Roofs 12, 13 may be advantageously supported by the rafters disclosed by the present patent.

Figure 2:
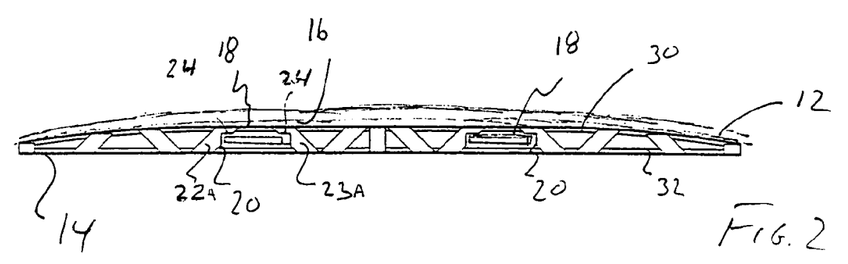
FIG. 2 is a front elevation of a roof support element or rafter and supported vehicle roof.

Referring to FIG. 2, the disposition of a roof support member or rafter 14 in relation to the underside 16 of vehicle replacement roof 12 or roof 13 is shown. Roof 12, and its underside 16, follow a gentle curve and are higher down the longitudinal center line of the roof than along the right and left hand sides of the vehicle. Rafter 14 supports roof 12 from side to side of the roof, the rafter conforming along the length of its upper surface to the side to side curvature of roof 12. Rafter 14 comprises an curved upper rail or chord 30 and an elongated base member 32, both of which are extruded aluminum members or rails. The radius of curvature of chord 30 may be varied to conform to the desired shape of replacement roof 12. Chord 30 and elongated base member 32 are disposed with the chord positioned above and aligned with the elongated base member in a common plane. Chord 30 and elongated base member 32 are joined to one another using a plurality of gussets including gussets 22A and 23A. Gussets 22A and 23A are disposed with respect to one another and include right angle notches 24 along one edge of each of the gussets to define a frame 20 through which ventilation ducts 18 may be passed.

Figure 3:
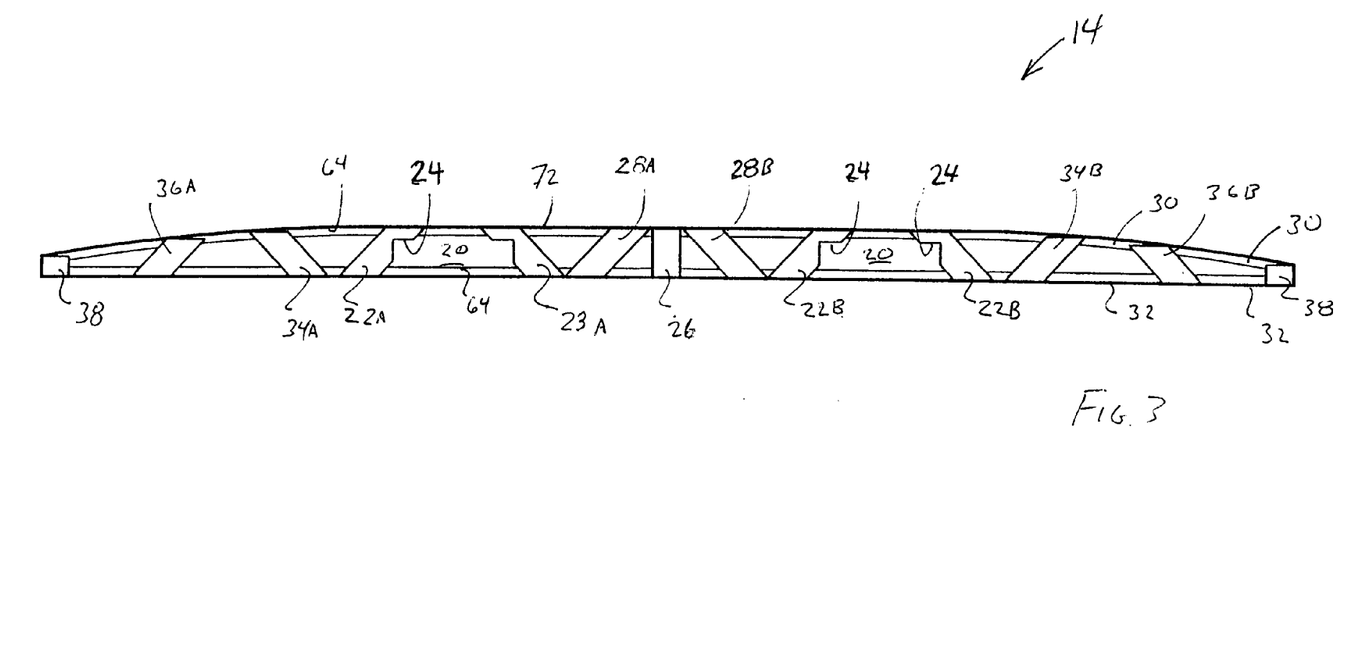
FIG. 3A is an enlarged front elevation of the rafter of FIG. 2.
FIG. 3B is a front elevation of an alternative embodiment for the rafter of the invention.
Figure 3A:
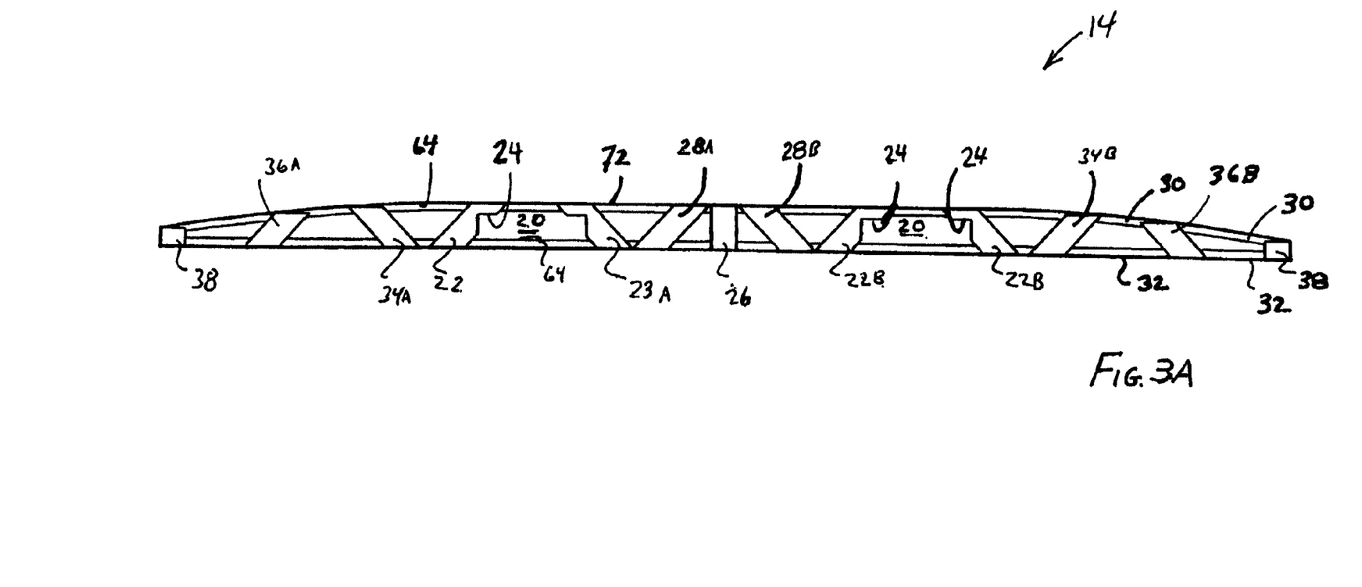

Referring now to FIG. 3A, the construction of rafter 14 is illustrated in greater detail. Chord 30 and elongated base member 32 are elongated rails disposed roughly parallel to one another discounting the curvature of chord 30. The curvilinear shape of chord 30 brings the ends of the chord closer to the ends of base member 32 than is the center of the chord relative to the center of the elongated base member and gives upper face 72 of rafter 14 a convex shape. Base member 32 and chord 30 incorporate flange like central upright members 64 (see FIG. 4) which extend toward one another and stiffen the rails longitudinally. The plurality of gussets are attached at bottom and top to central upright members 64. The gussets are identified by position in the preferred rafter 14 illustrated. At each end of rafter 14 is a rectangular end gusset 38. Moving inwardly from the ends are rhomboid shaped gussets 36A and 36B which are disposed to cant inwardly from bottom to top. Still further inwardly are a second set of rhomboid gussets 34A and 34B, which are canted outwardly from bottom to top. Still further inward toward the longitudinal center line of the vehicle are rhomboid gussets 22A and 22B. Rhomboid gussets 22A and 22B and 28A and 28B are all canted toward the center line of the vehicle from bottom to top. Rhomboid gussets 22A and 22B include a right angle notch on an inboard edge. Rhomboid gussets 23A and 23B, which are the next gussets inward from gussets 22A and 22B, are outwardly canted from bottom to top and also incorporate right angle notches 24, this time along an outwardly oriented edge so that the notches define two frames 20 through a rafter 14. Disposed along the vehicle center line and at the center of rafter 14 is a rectangular gusset 26.

Figure 3B:
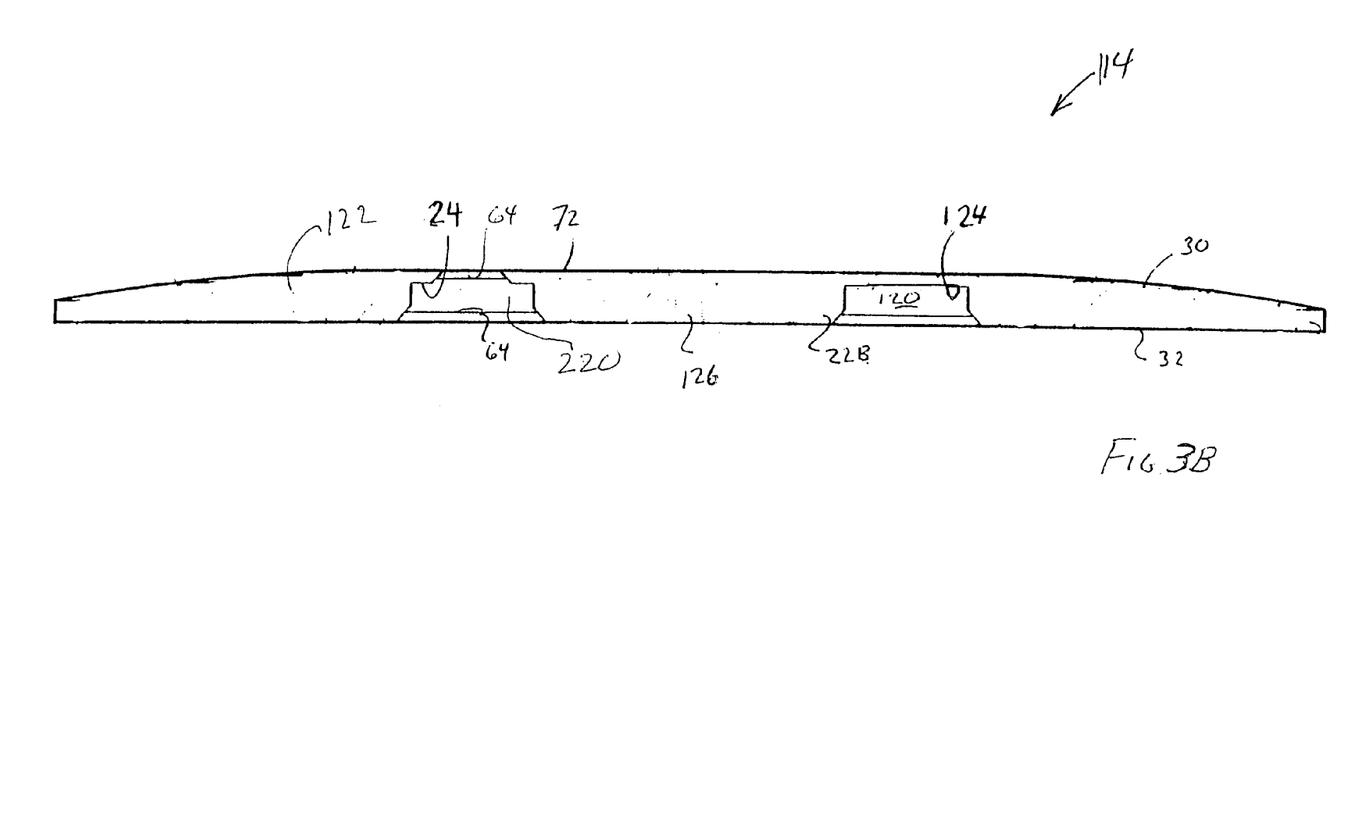

Referring now to FIG. 3B the construction of an alternative embodiment rafter 114 is illustrated. Again the chord 30 and elongated base member 32 are elongated rails disposed roughly parallel to one another discounting the curvature of chord 30. The curvilinear shape of chord 30 brings the ends of the chord closer to the ends of base member 32 than is the center of the chord relative to the center of the elongated base member and gives upper face 72 of rafter 114 a convex or outwardly bowed shape. Base member 32 and chord 30 incorporate flange like central upright members 64 (similar to those illustrated in FIG. 4) which extend toward one another and stiffen the rails longitudinally. Instead of gussets, aluminum sheets are attached at bottom and top to central upright members 64 of chords 30 and 32. A single aluminum sheet may be used, as indicated by sheet 126 which spans a frame 120 through the sheet, or the sheet may be broken into segments, as indicated by the break between sheet 122 and sheet 126 occurring at frame 220.

Figure 4:
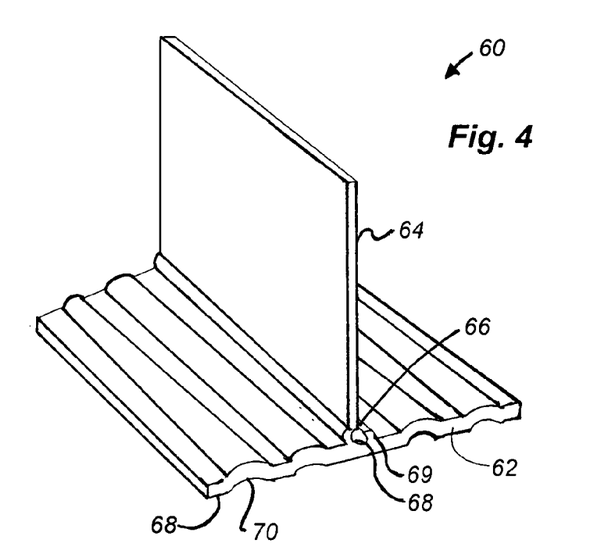
FIG. 4 is a perspective view of a section of an elongated member adaptable to serve as a chord or base member of the rafter.

Referring to FIG. 4 a representative elongated rail 60, which may serve as either chord 30 or elongated base member 32, is illustrated to advantage in perspective. Elongated rail 60 has a T-shaped cross section with a cross member or bar 62 and an upright member 64 which extends outwardly from one face of the cross bar 62. At the juncture between upright member 64 and cross bar 62 a semi-cylindrical pocket 68 is formed which extends the length of rail 60 along one side of upright member 64. Pocket 68 is formed by an indentation 66 in the base of upright member 64 and a raised lip 69 extending upwardly from cross bar 64. Pocket 68 is accessible through a gap 71 (see FIG. 7) between lip 69 and upright member 64. Four parallel grooves 70 are formed into face 72 of cross bar 62 opposite the face upright member 64 joins the cross bar. Grooves 70 extend parallel to pocket 68 for the length of rail 60. As stated above, rail 60 is extruded from aluminum and can given a curved shape to conform to the shape of a replacement roof. Pocket 68 provides a position for placement of a gusset edge or aluminum sheet edge.

Figure 5A:
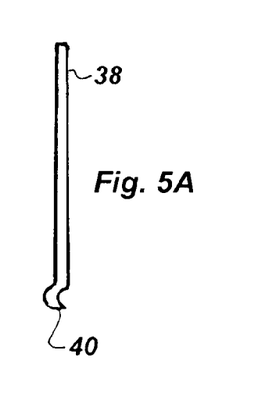
FIGS. 5A–B are views of a gusset used with the chord and elongated base members.
Figure 5B:
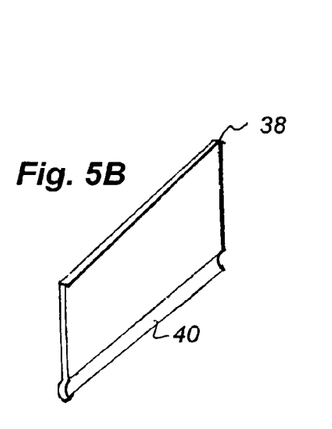

FIGS. 5A–B illustrate end gusset 38, which is taken as representative of the gussets or aluminum sheets generally. Gusset 25 has four edges one of which, intended for introduction to a pocket 68, is shaped as a hook 40 which is rounded on one side to nestle into pocket 68 under the main body of upright member 64 and indented on the opposite side to cooperate with lip 69. Hook edge 40 is intended to be fitted into the a pocket 68 in the usually straight, elongated base member 32.

Figure 6:
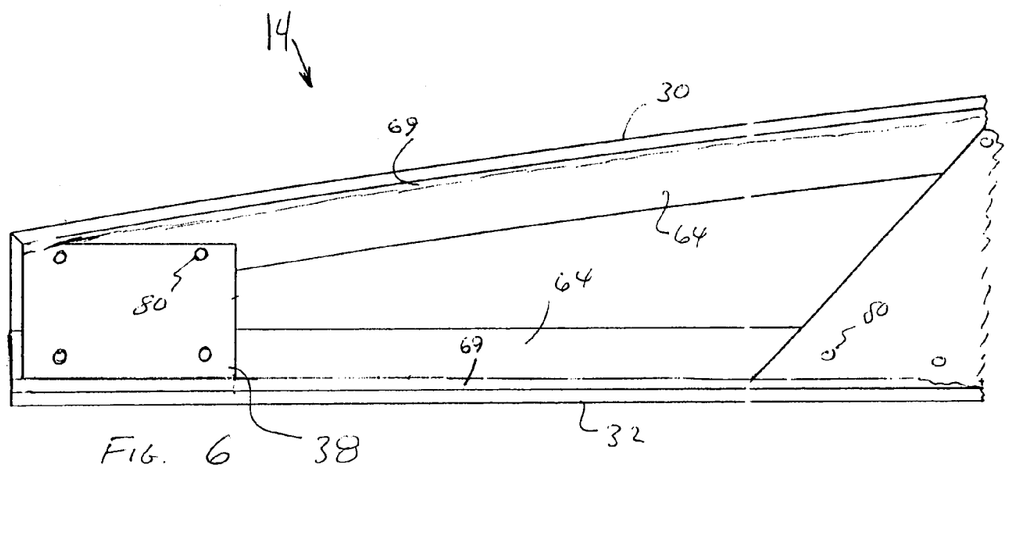
FIG. 6 is a detail view of one end of the rafter.
Figure 7:
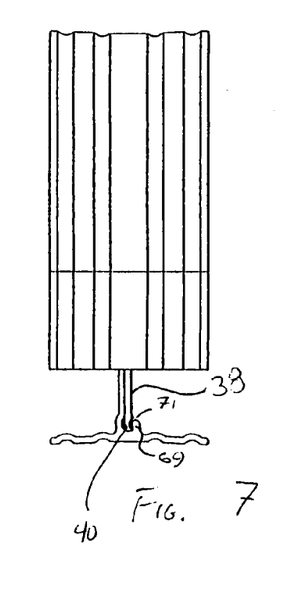
FIG. 7 is an end of view of the rafter.

Referring to FIGS. 6 and 7 views of an end portion of rafter 14 illustrate cooperation between a representative gusset, here end gusset 38. End gusset 38 connects chord 30 with elongated base member 32 by attachment to upright members 64, which extend toward one another from their respective rails. Attachment is by means of conventional fasteners 80 driven or screwed through the gusset 38 and adjacent upright member 64. Hook edge 40 of gusset 38 is positioned downwardly, disposed in pocket 68 of elongated base member 32. The opposite edge of gusset 38 may, at one end closer to the end of rafter 14, be placed in a pocket of chord 30, if provided. The bulk of the loading of gusset 38 is however carried through fasteners 80 whether gussets or an aluminum sheet is used.

Figure 8:
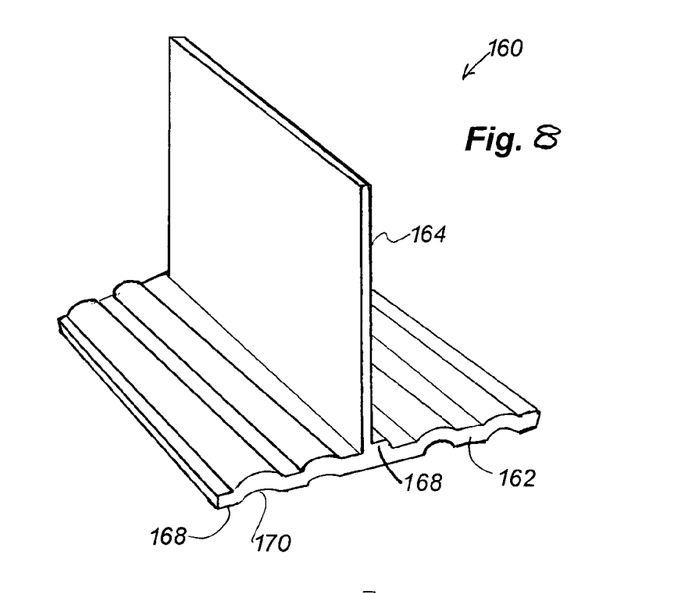
FIG. 8 is a perspective view of a section of an alternative elongated member adaptable to serve as a chord or base member of the rafter.

In some embodiments the semi-cylindrical pocket 68 may be eliminated. Referring to FIG. 8 a representative elongated rail 160, which may serve as either chord 30 or elongated base member 32, is illustrated. Elongated rail 160 has a T-shaped cross section with a cross member or bar 162 and an upright member 164 which extends outwardly from one face of the cross bar 162. At the juncture between upright member 164 and cross bar 162 a base platform 168 is formed which extends the length of elongated rail 160 along one side of upright member 164. Base 168 is formed by a raised section at the base, or point of juncture of upright member 164. Four parallel grooves 170 are formed into face 172 of cross bar 162 opposite the face upright member 164 joins the cross bar. Grooves 170 extend parallel platform 168 for the length of elongated rail 160. Rail 160 is extruded from aluminum and can given a curved shape to conform to the shape of a replacement roof. Platform 168 provides a position for placement of a gusset or aluminum sheet edge.

Figure 9A:
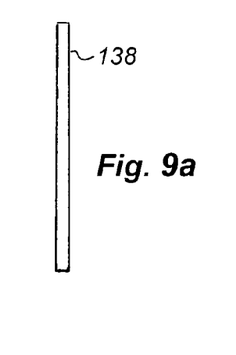
FIGS. 9A–B are views of a gusset used with the alternative elongated base members.
Figure 9B:
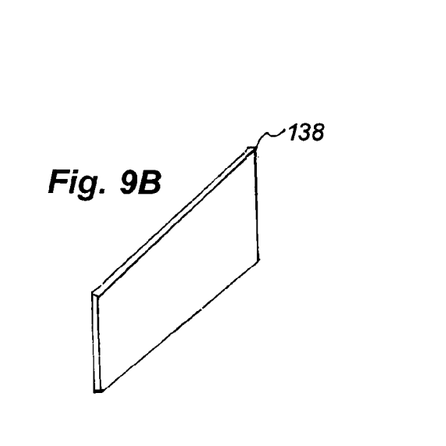

FIGS. 9A–B illustrate end gusset 138, which is taken as representative of the gussets or aluminum sheets generally. Gusset 138 has four straight flat edges, anyone of which may abut a platform 169 for support.

Figure 10:
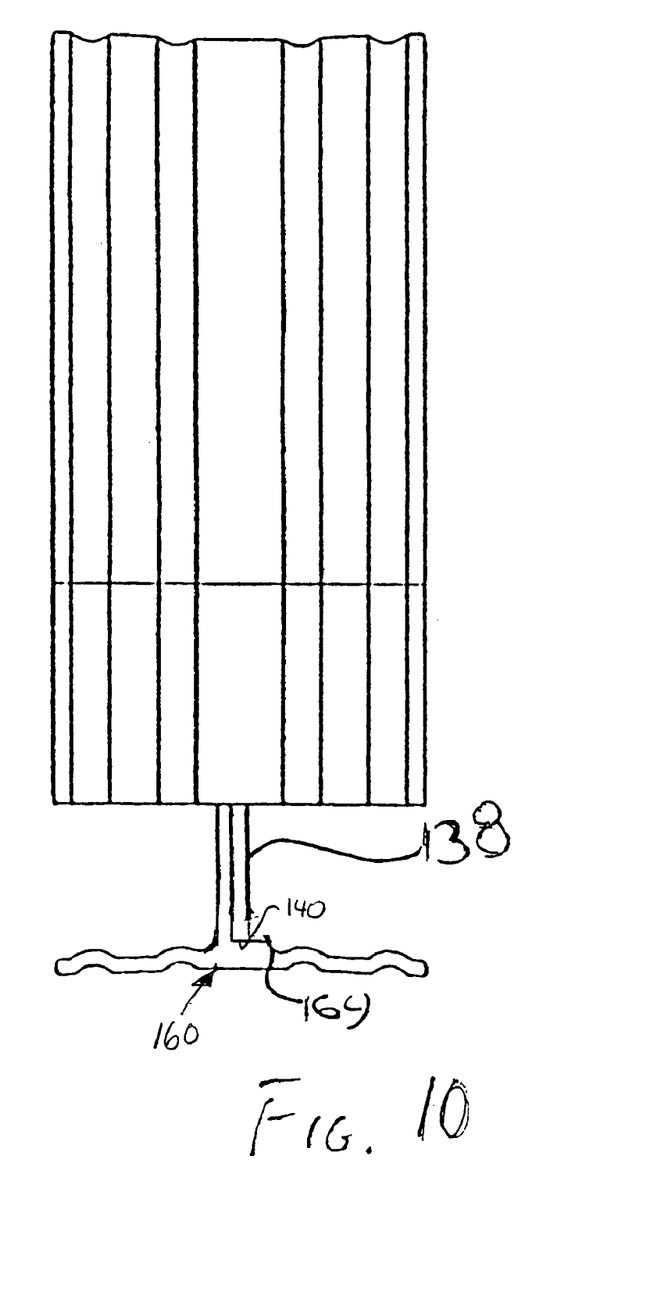
FIG. 10 is an end view of the alternative elongated base member.

Referring to FIG. 10, an end portion of rafter 14 illustrate cooperation between a representative gusset, here gusset 138 and a T-section aluminum rail 160 functioning as a chord. Edge 140 of gusset 138 is downwardly oriented, resting on platform 169 of elongated rail 160. The bulk of the loading of gusset 138 is imposed on fasteners 80 as illustrated in FIG. 6.

The invention provides a rafter of light weight, strong, and easily shaped to conform to curved roof lines. The rafter is also simple, facilitating its manufacture with reduced direct labor input.

While the invention is shown in only one of its forms, it is not thus limited but is susceptible to various changes and modifications without departing from the spirit and scope of the invention.

What is claimed is:

1. A vehicle roof support, comprising:
   an elongated base member having a roughly T-shaped cross-sectional shape with an upright member corresponding to the upright of the T and a cross member corresponding to the upper cross bar of the T;
   a chord having a roughly T-shaped cross-sectional shape with an upright member corresponding to the upright of the T and a cross member corresponding to the upper cross bar of the T, the chord being disposed in a common plane with respect to the elongated base member and spaced from the elongated base member along a portion of the length of the elongated base member;
   a support element disposed between the elongated base member and the chord joining the elongated base member to the chord;
   the elongated base member further comprising an elongated pocket nestled to one side of the upright member at a juncture between the upright member and cross member; and
   the chord having a contoured profile allowing a side of the cross member to fit against an underside of a vehicle roof.

2. A vehicle roof support as set forth in claim 1, the support element comprising a plurality of gussets.

3. A vehicle roof support as set forth in claim 2, further comprising:
the plurality of gussets being oriented to lie in the common plane of alignment of the chord and the elongated base member and extending from points of connection between the gussets and the upright members of the elongated base member and the chord, respectively.

4. A vehicle roof support as set forth in claim 3, further comprising:
several of the plurality of gussets including notches along side thereof to define frames for conduits to pass through the vehicle roof support element.

5. A vehicle roof support as set forth in claim 4, further comprising an elongated hook along an edge of each gusset which is shaped to cooperate with the elongated pocket.

6. A vehicle roof support as set forth in claim 1, the support element further comprising one or more sheet sections.

7. A vehicle roof support as set forth in claim 6, the elongated base member further comprising an elongated pocket nestled to one side of the upright member at a juncture between the upright member and cross member.

8. A vehicle roof support as set forth in claim 7, further comprising:
the sheet section including a notch into one edge defining a frame for a conduit to pass.

9. A vehicle roof support as set forth in claim 8, further comprising an elongated hook along an edge of the sheet section.

10. A rafter comprising:
a lower rail and an upper rail, each being of sufficient length to extend from side to side of a roof of a vehicle;
the lower and the upper rail each comprising a cross member and an upright member, the upper member extending outwardly perpendicular from one face of the cross member, the upper and lower rails being disposed in a common plane with their respective upright members extending toward one another across an opening of varying width;
at least a first member attached to the upright members and extending between the lower and upper rails to join the upper and lower rails to one another; and
the cross member of the upper rail having a second face exhibiting a curve of a selected, finite radius conformed to fit against an underside surface of the roof of a vehicle.

11. A rafter as claimed in claim 10, further comprising:
the lower rail comprising an elongated pocket defined between one side of the upright member and a side of the cross member to one side of the upright member.

12. A rafter as claimed in claim 11, said at least first member further comprising an elongated hook along an edge thereof for insertion into the elongated pocket for cooperation with the elongated pocket aiding retention of the gusset with respect to the lower rail.

13. A rafter as claimed in claim 11, further comprising:
said at least first member being among a plurality of gussets; and
at least a first pair of the plurality of gussets being notched along adjacent edges to define a frame for a conduit to be passed through the rafter.

14. A rafter as claimed in claim 13, further comprising:
the upper and lower rails being extruded.

15. A rafter as claimed in claim 12, further comprising:
said at least first member being a sheet section; and
the sheet section gussets being notched to define a frame for a conduit to be passed through the rafter.

* * * * *